L. L. RANDALL AND E. A. FRIES.
CLAY TURNING MACHINE.
APPLICATION FILED JUNE 12, 1916.

1,348,580.

Patented Aug. 3, 1920.
3 SHEETS—SHEET 1.

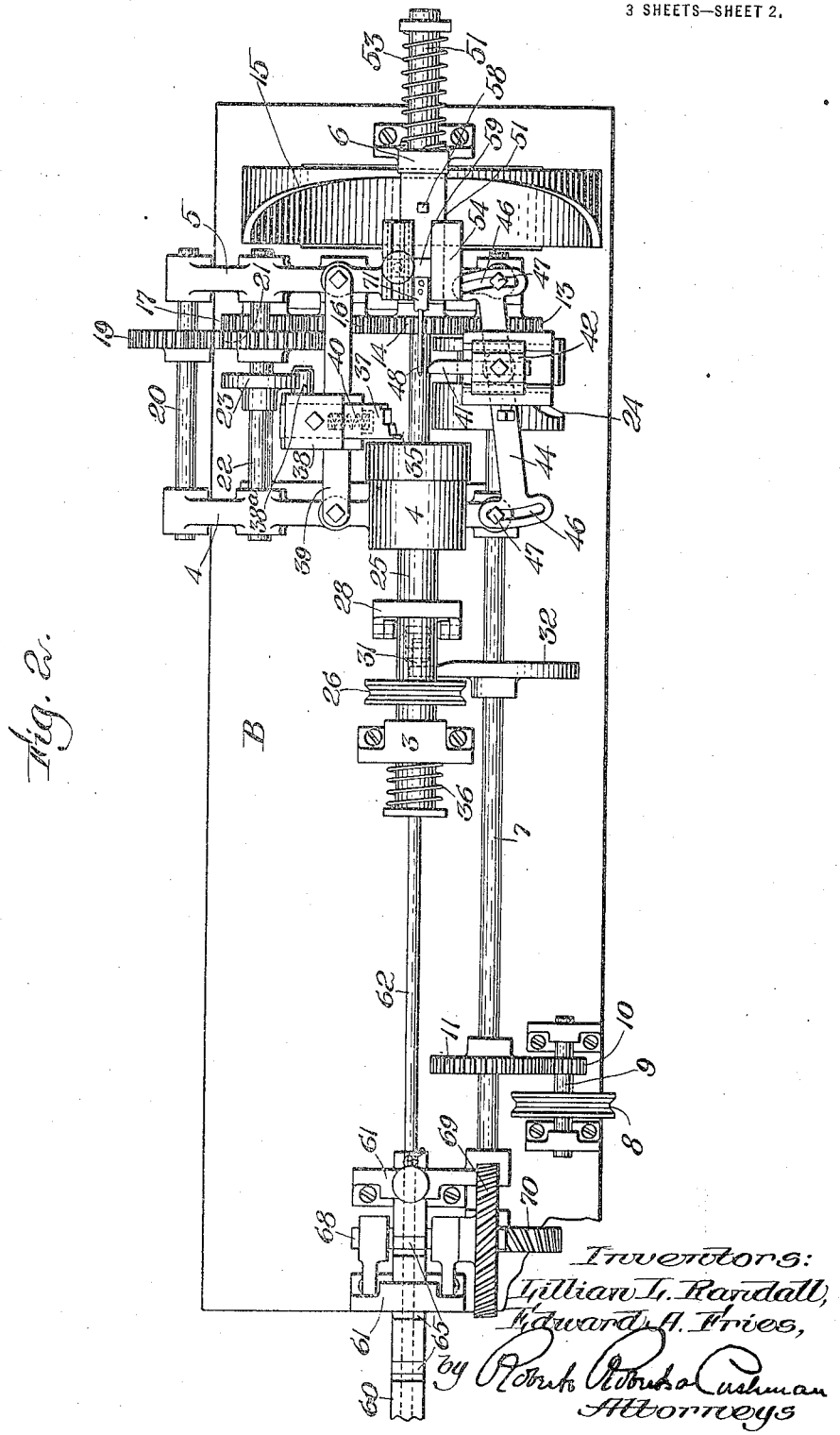

L. L. RANDALL AND E. A. FRIES.
CLAY TURNING MACHINE.
APPLICATION FILED JUNE 12, 1916.

1,348,580.

Patented Aug. 3, 1920.
3 SHEETS—SHEET 3.

Inventors:
Lillian L. Randall,
Howard A. Fries,
by Roberts Roberts & Cushman
Attorneys.

UNITED STATES PATENT OFFICE.

LILLIAN L. RANDALL AND EDWARD A. FRIES, OF BOSTON, MASSACHUSETTS.

CLAY-TURNING MACHINE.

1,348,580.  Specification of Letters Patent.  Patented Aug. 3, 1920.

Application filed June 12, 1916. Serial No. 103,081.

*To all whom it may concern:*

Be it known that we, LILLIAN L. RANDALL and EDWARD A. FRIES, both citizens of the United States, and residents of Boston, in the county of Suffolk and State of Massachusetts, have invented new and useful Improvements in Clay-Turning Machines, of which the following is a specification.

This invention relates to a machine for turning articles from a bar or rod of plastic material, and more particularly for turning and forming such articles as spark plug bodies automatically from a bar or rod of clay. Heretofore the practice has been to turn such articles from spools or short lengths of clay and it has not been found practicable so far as we are aware successfully to form such articles from a bar of clay on account of the soft and plastic nature of the material and the difficulty of handling it except in small units without breaking and destroying a very large percentage of the material. The object of the present invention is to produce a machine for turning and forming articles from the continuous clay bar that may be several feet in length, which will perform its various operations of cutting, forming and boring automatically and far more rapidly than has heretofore been possible in machines handling individual spools or short blanks, and which will do its work accurately and without danger of injury to the bar being operated upon.

In the accompanying drawings which illustrate a turning machine embodying the invention,—

Figure 1 is a side view, partly in section, of the machine;

Fig. 2 is a plan view of the machine;

Fig. 6 is a longitudinally vertical section of parts of the step-by-step work feeding mechanism.

Figure 3:
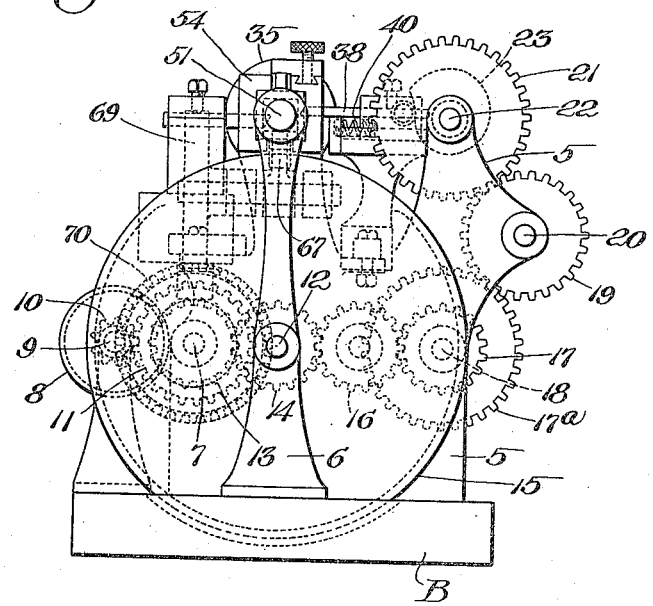
Fig. 3 is an end elevation viewed from the right of Figs. 1 and 2.
Figure 4:
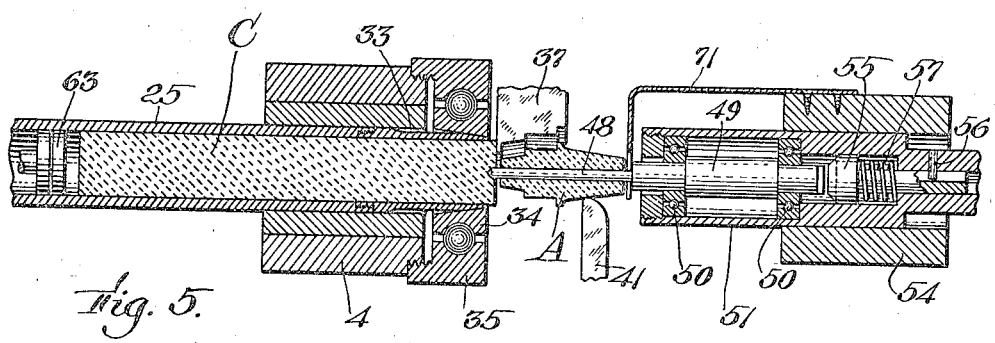
Fig. 4 is an enlarged horizontal section showing in detail the hollow spindle which carries the bar of clay, and the forming, cutting and boring instruments.
Figure 5:
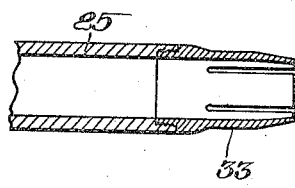
Fig. 5 is an enlarged detail showing the construction of the gripping collet at the end of the hollow spindle.

Referring to the drawings, B is the bed plate of the machine upon which all the working parts are mounted. Upright standards 1, 2, 3, 4, 5 and 6 support the various parts as hereinafter more fully explained, the standards 4 and 5 constituting the main supporting frames between which the forming, cutting and boring instruments are located. 7 is the main driving shaft, journaled in standards 2, 4 and 5, and takes its power from driving pulley 8 on a short shaft 9 mounted on suitable standards, and thence through gear 10 fast on shaft 9 and gear 11 fast on shaft 7. The driving pulley 8 is connected with any suitable source of power (not shown).

The center shaft 12 is journaled in standards 4, 5 and 6, and is rotated through gears 13 and 14 fixed respectively to shafts 7 and 12. A drill cam 15 for actuating the boring tool or drill, hereinafter described, is fixed to shaft 12 between standards 5 and 6. The forming tool is actuated from shaft 12 through gear 14 fixed on shaft 12, gear 16, journaled on an idler shaft, gear 17 fixed on shaft 18, gear 17ª also fixed to shaft 18, idler gear 19 mounted on shaft 20, and gear 21 mounted on cam shaft 22, to which is fixed the cam 23 for reciprocating the forming tool. Shafts 18, 20 and 22 are supported between the upright standards 4 and 5.

The cutting tool, hereinafter described, is actuated from shaft 7 by means of the cutting tool cam 24 fixed to shaft 7.

The means for supporting and rotating the bar of clay or similar plastic material consists of a hollow spindle 25 journaled in suitable bearings at the top of standards 3 and 4 and actuated by a pulley 26 tight on the hollow spindle and driven from any suitable source of power (not shown). The hollow spindle 25 is capable of slight endwise movement in its bearings and is shifted endwise by means of a shipper rod 30 connected to a ring 28, in which is a ball raceway 27 fixed to the hollow spindle, and ball bearings 29 between the raceway 27 and the ring 28, thereby allowing the spindle to turn freely within the shipping ring 28. The shipper rod 30 is pivoted at its lower end to the bed plate B and is oscillated by means of a cam 32 against which a cam roller 31 runs, mounted on a suitable bracket on rod 30.

The forward end of the hollow spindle 25 is provided with a collet 33, the end of which is divided by a series of slots 33ª forming a plurality of resilient fingers or compressible jaw members adapted frictionally to engage the bar of clay or similar plastic material C. The bar of clay C fits loosely within the body of the hollow spindle 25 but is frictionally gripped at the forward end by the resilient fingers of the collet 33 so as to rotate with the hollow spindle. The exteriors of the fingers at the extremity of the collet 33 are tapered so as to engage a clutch ring 34 which turns in ball bearings in the ball bearing ring 35 fixed to the end of the spindle bearing at the top of standard 4. A spring 36 at the rear end of the hollow spindle between the upright 3 and a suitable flange or collar on the hollow spindle normally tends to urge the hollow spindle 25 rearwardly out of engagement with the clutch ring 34 when the lower part of cam 32 permits the spindle 25 to move in that direction. The clutch ring 34 serves to press the resilient gripping fingers of the collet 33 into firm contact with the clay bar C, and also serves to hold the end of the collet and the clay bar gripped thereby accurately concentric with the axis of the spindle, it being understood that the resilient gripping fingers if not thus supported and centered are sufficiently flexible to endanger the forwardmost end of the clay bar, being deflected from the true axis of the spindle.

The forming tool 37, which as herein shown has a configuration adapted to shape one end of the porcelain body of a spark plug, is mounted to slide forward and backward in a slideway 38 which is adjustable lengthwise of a crosshead 39 mounted on the top of standards 4 and 5. The forming tool 37 is actuated by the cam 23 which pushes the tool 37 forward, while a spring 40 draws it back and holds the cam follower 38ª against the face of cam 23. The forming tool 37, as herein shown, is also provided with a projection which serves as a cutting off tool for the finished article A when the forming, cutting and boring operations are completed.

The cutting tool 41 at the opposite side of the work from the forming tool is fixed in a clamp 42, the latter being adjustably secured to a block 43 which slides lengthwise of bar 44. A cam follower 45 secured to the bottom of block 43 engages the cam path in cam 24 by which the cutting tool 41 is reciprocated. The bar 44 may be adjusted on the standards 4 and 5 to various angles with relation to the work by means of slots and bolts 46 and 47, one pair at each end, thereby determining the taper of the cut of tool 41. It will be understood that the tool 41 cuts the tapered end of the porcelain body of a spark plug A opposite the end shaped by the forming tool 37.

A drill or boring tool 48 for drilling a hole through the center of the spark plug body or other article being made is fixed to a tool holder 49, which is rotatably mounted on ball bearings 50, 50, in the forward end of the hollow drill carrier 51. The drill carrier 51 does not rotate but is mounted to slide lengthwise in suitable bearings at the top of standards 5 and 6. The forward end of the carrier 51 is square and is guided in a square way 54 at the top of standard 5. The carrier 51 is moved forward by the cam 15 and cam roller 52 secured to the carrier 51, and is moved backward by spring 53 between the upright 6 and a suitable collar on the rear end of carrier 51.

The tool holder 49 is normally held against rotation by means of a clutch member 55 mounted inside of the carrier 51 and having a clutch surface coöperating with a complemental clutch surface on the rear end of tool holder 49. The clutch member 55 is held against rotation in the carrier 51 by any suitable means, such as a pin 56, extending from the carrier 51 into a suitable slot or groove in the stem of clutch member 55. A spring 57 normally presses the clutch member forward into engagement with the complementaly clutch surface on the end of tool holder 49, thereby holding the tool holder 49 normally against rotation. As the carrier 51 is moved forward by the cam 15 the tool and tool holder will be held fixed or non-rotatable until the latch 58, which is mounted to slide in a suitable hole or slot in the carrier 51, engages the inclined latch-actuating surface 59 mounted on the top of the slideway 54. Thereupon the latch 58 is pushed inward engaging the clutch member 55, arresting the latter, and pushing it out of engagement with the complementary clutch surface on the end of the tool holder 49. The tool holder and boring tool are now free to turn in the ball bearings 50 with the rotating clay bar, thereby preventing the friction between the boring tool and the clay from breaking the bar, and also acting as a rotating arbor to support the clay while the forming and cutting tools 37 and 41 are finishing their work.

The several tool-actuating cams are arranged and timed so that the boring tool starts first, the cutting tool starts next and makes its complete travel forward before the forming tool starts, and the forming tool starts before the boring tool has completed its stroke. By the time the forming tool and cutting tool have so far reduced the diameter of the clay blank as to endanger its breaking off, the drill will have traveled the full length of its stroke and have been released from the clutch member 55 so that the boring tool will remain in the clay blank but will rotate therewith, thus stopping the friction between the boring tool and the clay blank and at the same time acting as a rotary supporting arbor to support the blank while the forming tool is finishing its work.

The mechanism for feeding the clay bar C forward step by step predetermined lengths for forming the successive articles cut therefrom consists of a feed bar 60 mounted to slide in ways 61 at the top of uprights 1 and 2, and a push rod 62 which is movable lengthwise in the feed bar 60. A ball bearing disk 63 is mounted at the forward end of the push rod 62 to engage the rear end of the clay bar and to rotate with the clay bar as the latter turns with the rotary hollow spindle 25. The push rod 62 is held in projected position, as shown in Fig. 1, by means of a removable pin 64 passing through slots in bar 60 and rod 62. A series of notches 65 corresponding to the length of the successive forward feeding movements of the clay bar are provided in the top of bar 60 and are engaged successively by a spring-pressed latch 66 mounted in the slideway 61 at the top of upright 2. The feed bar 60 and push rod 62 are advanced intermittently step by step by means of a gear segment 67, which engages a rack 67ª on the under side of bar 60. The gear segment 67 is fast on shaft 68, journaled in brackets mounted on upright 1, and a worm wheel 69 also fast on shaft 68 meshes into and is driven by a worm gear 70 fast on the end of driving shaft 7. At each rotation of the worm gear 69 and gear segment 67 the feed bar 60, push rod 62 and clay bar C will be advanced one step, or the distance of one notch 65. This step by step feeding device is so timed that the clay bar will be advanced after the completion of each operation of the cutting, forming and boring tools, and at the time when the clutch ring 34 at the forward end of the rotary spindle is released from the gripping fingers of the collet 33.

In order to insert a new clay bar C, the push rod 62 may be withdrawn from the rear end of the spindle 25 and pushed rearwardly through the bar 60 by removing the lock pin 64. After the clay bar C has been inserted in the hollow spindle 25, push rod 62 is again projected to the position shown in Fig. 1, and locked in projected position by means of pin 64. After the feed bar 60 has been moved forward its full length as above described, it may be returned to its initial position by hand by lifting the latch 66 out of the notches 65 and sliding the bar 60 rearwardly in its slideway 61.

In the machine above described the fragile and flexible clay bar C is supported throughout its whole length in the hollow rotary spindle 25 with the exception of the short end projecting into the region of the working tools. It may thus be given a very high speed of rotation and is fully protected against the danger of breaking. The speed of operation and the rate of production of the machine in forming and cutting off the desired articles from the end of a continuous bar, are very much higher than has heretofore been possible in machines forming similar articles from individual short units or spools which have to be inserted in the machine one by one. The clay bar is automatically fed forward step by step to present the requisite end for the operation of the forming instruments, and is held by a gentle but sufficiently firm grip to rotate with the hollow spindle 25 without danger of breaking the rod; and the projecting end of the blank from which the articles are being formed is supported during the critical operation of the forming and cutting tools by means of the boring tool which is released after the performance of its boring function, so as to rotate with the work and afford a supporting arbor to reinforce the article against the action of the forming and cutting tools.

During the retracting movement of the boring tool 48 after the turned article is completed, a stripping device 71, consisting of a finger or pair of fingers extending between the forward end of the tool holder 49 and the nearest end of the finished artcle A, and secured to the fixed slidway 54 engages the end of the finished article, pushing it off from the receding boring tool 48, whereupon the finished article is dropped out of the machine into a suitable chute or other receptacle (not shown).

We claim:

1. A machine for turning plastic material comprising a tube adapted to have an elongate rod of plastic material fed therethrough, the tube being arranged closely to confine the rod of plastic material throughout the entire length of the rod, means at the forward end of the tube yieldingly to grip said rod throughout an extensive area, a tool in operative relationship to the end of said rod projecting from the forward end of said tube, and means for producing relative angular motion between the tube and the tool to cause the tool to operate upon the rod.

2. A turning machine of the character described comprising an elongate tubular spindle adapted to have a bar of plastic material fed therethrough, the forward end of the spindle having tapered means for gripping said bar, a tapered collar surrounding the gripping means so as to cause said means to grip the bar when the spindle is reciprocated to carry the gripping means into the collar, the collar being idly mounted so that it will rotate with the spindle when the spindle is advanced into the collar, and means to rotate the spindle.

3. A machine for turning plastic material comprising a rotary tube adapted to have an elongate rod of plastic material fed therethrough, the tube being arranged closely to confine the rod of plastic material throughout the entire length of the rod, the forward end of the tube being slotted so as to form a plurality of yielding fingers of substantially the same internal diameter as the tube and covering substantially the entire periphery of the rod at the forward end of the tube, and means for rotating the tube so as to turn the end of said rod of plastic material projecting beyond the end of said tube.

4. A turning machine of the character described comprising a hollow spindle along which a bar of plastic material is adapted to be fed, means for gripping said bar at the forward end of the spindle while the bar is being turned at its forward end, means for intermittently releasing the bar and stepping it forward, the latter means including a push rod engaging the rearward end of said bar and means for disengaging the push rod from the end of said bar after the bar has been stepped forward.

5. A turning machine of the character described comprising a hollow spindle adapted to receive a bar of plastic material, the forward end of the spindle being provided with compressible means having an outer surface tapered forwardly, a collar surrounding the compressible means and having an inner surface tapered forwardly so that the compressible means is caused to grip said bar when the spindle is moved forwardly, means for intermittently retracting the spindle to release said bar, and means for advancing the bar along the spindle while the spindle is retracted, the latter means including a push rod engaging the rearward end of said bar, said bar being carried forward out of engagement with the push rod after each advancement by the spindle being moved forwardly into said collar.

6. A machine for turning plastic material comprising means for rotating a bar of plastic material, a boring tool, means for advancing the boring tool into said bar along the axis of rotation of the bar, and means for turning the exterior of the bar while the boring tool is extended thereinto, whereby the boring tool functions as an arbor to support the plastic material while it is being turned.

7. A turning machine of the character described comprising means for rotating a bar of plastic material, a boring tool, means for advancing the boring tool into said bar along the axis of rotation of the bar, means for restraining the boring tool from rotating until it has been advanced a predetermined distance into the bar and then releasing it so that it may rotate with the bar, and means for turning the exterior of the bar while the boring tool is extended thereinto, whereby the boring tool functions as an arbor to support the plastic material while it is being turned.

8. A turning machine of the character described comprising means for rotating a blank of plastic material, a boring tool carrier, means to reciprocate said carrier toward and from the rotating means, a boring tool rotatably mounted in said carrier, means normally to hold said tool against rotation, means actuated at a predetermined point in the movement of the carrier to release the tool for rotation with the blank, and means for automatically turning the exterior of the blank while the boring tool is extended thereinto, whereby the boring tool functions as an arbor to support the plastic material while it is being turned.

9. A machine for turning plastic material comprising a hollow spindle adapted to hold and support a bar of plastic material to be operated upon, means to rotate the hollow spindle, a push rod extending into the rear end of the hollow spindle having a rotary head, and means to actuate said push rod to advance said bar through said hollow spindle.

10. A turning machine of the character described comprising means to support and rotate the blank to be operated upon, a boring tool carrier, means to move said carrier toward and away from the blank supporting means, a boring tool rotatable in said carrier, means normally to hold said boring tool against rotation, and means actuated at a predetermined point in the movement of the carrier to release the tool so as to permit it to rotate.

11. A turning machine of the character described comprising a hollow spindle adapted to hold and support a bar of plastic material to be operated upon, means to rotate the hollow spindle, a boring tool carrier, means to move said carrier toward and away from the hollow spindle, a boring tool rotatable in said carrier, mean normally to hold said boring tool against rotation, and means actuated at a predetermined point in the forward movement of the carrier to release the tool and permit the same to rotate with the work.

12. In a machine of the character described, a hollow tool carrier, means to reciprocate said carrier, a tool holder rotatable in said carrier having a clutch member at its inner end, a complementary clutch member movable lengthwise in said carrier normally engaging the clutch member on the tool holder, and a stop adapted to arrest said lengthwise movable clutch member and disengage the same from the tool holder at a predetermined point in the forward movement of the carrier, thereby releasing the tool holder so as to permit it to rotate.

13. The method of forming tubular articles from plastic material comprising rotating a blank of the plastic material, boring the blank along its axis of rotation, and turning the exterior of the blank while the boring tool is extended thereinto, the plastic blank being supported by the boring tool while being turned.

Signed by us at Boston, Massachusetts, this seventh day of June, 1916.

LILLIAN L. RANDALL.
EDWARD A. FRIES.